UNITED STATES PATENT OFFICE.

EDWARD VICTOR ESPENHAHN, OF PORT PIRIE, SOUTH AUSTRALIA, AUSTRALIA.

TREATMENT OF GASES CONTAINING SULFUR DIOXID.

1,315,183.      Specification of Letters Patent.      Patented Sept. 2, 1919.

No Drawing.     Application filed October 19, 1918. Serial No. 258,857.

*To all whom it may concern:*

Be it known that I, EDWARD VICTOR ESPENHAHN, a subject of the King of Great Britain, residing formerly at 1 William street, Brighton, in the State of Victoria, Commonwealth of Australia, but now of care of ,The Broken Hill Associated Smelters Proprietary Limited, of Port Pirie, in the State of South Australia, Commonwealth of Australia, chemical engineer, have invented certain new and useful Improvements in the Treatment of Gases Containing Sulfur Dioxid, of which the following is a specification.

This invention relates to the treatment of gases containing sulfur dioxid and refers more especially to the treatment of flue gases from metallurgical operations containing small proportions of sulfur dioxid such as from 1% to 2% which have hitherto not been amenable to treatment for the economical recovery or utilization of the sulfur dioxid contained therein.

The object of this invention is to provide a method of treatment of such gases whereby the sulfur dioxid is economically recovered as free sulfur and sulfur dioxid in concentrated form. This sulfur may be burnt for the formation of sulfur dioxid which, as well as the sulfur dioxid formed in the process, may be used for the manufacture of sulfuric acid or for other industrial purposes. Furthermore another product of the process may be sodium thiosulfate in commercial form.

I accomplish this object by providing a method of treatment of such gases which comprises washing the gases containing sulfur dioxid with a solution of an alkaline thiosulfate (such as sodium thiosulfate) for the absorption of the sulfur dioxid and the formation of sodium polythionates; treating such polythionate solutions for the formation of sodium sulfate, sulfur and sulfur dioxid; heating the said sodium sulfate with carbon for the formation of sodium sulfid, which is used for regenerating sodium thiosulfate from the polythionate solutions formed as above and using such regenerated thiosulfate for washing fresh gases containing sulfur dioxid with at the same time precipitating and recovering further quantities of free sulfur.

In the operation outlined as above the solution of sodium polythionates, formed by the action of sulfur dioxid upon sodium thiosulfate, is adapted to perform two functions. One function is the regenerating of the thiosulfate by the addition of sodium sulfid. The other is to provide the source of such sodium sulfid. Consequently for the purpose of clearness of description the solution of sodium polythionates is described as being divided into two parts, one of which is applied to the production of sodium sulfid for the regeneration of the other part into sodium thiosulfate which is used again in treating fresh gases. In practical operation however the same effect may be obtained by effecting the contact between the gases and the absorptive solution in two or more towers and converting the polythionates from one tower to sodium sulfid which is used for regenerating the polythionates to thiosulfate in the other tower. This regeneration may be continuously effected by continuously adding sodium sulfid to the solution circulating in the last tower so that the polythionates are regenerated to thiosulfates as formed.

In carrying this invention into effect the gases containing sulfur dioxid (even in small proportions that is even less than 1% and from 1% to 2%) are subjected to a washing operation with a solution of sodium thiosulfate. The washing is effected in any suitable form of apparatus preferably of that type in which the gases pass through towers or washers in which the solutions are continuously circulated in the form of a spray. The washing is preferably effected in two or more towers or washers the circulation in the later towers of the series being with solutions richest in sodium thiosulfate where gases containing only the last traces of $SO_2$ come into contact therewith while the circulation in the earlier towers in the series is with solutions richest in sodium polythionates where gases richest in $SO_2$ are met.

The absorption of the $SO_2$ by the solution of sodium thiosulfate results in the formation of polythionates namely the tri-thionate, tetra-thionate and penta-thionate in accordance with the following equations:—

(1) 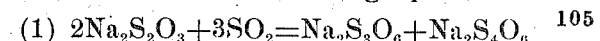

(2) 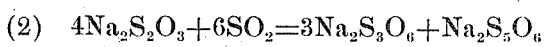

When the greater part of the thiosulfate has been converted to polythionates as above the gases are by-passed into another washer containing a fresh solution of thiosulfate and the reaction is repeated or alternatively the solution may be withdrawn and fresh solutions introduced to the same washer as may be most convenient in practice. In practice the washing solutions of the later tower or washer in the series are transferred to the next tower or washer above it in series, the washing solutions in the uppermost tower or washer being richest in polythionates, having been withdrawn. A portion of the solution of polythionates obtained as above that is to say that withdrawn from the earliest tower or washer in the series, is then heated in a suitable tank or vessel (such as by steam coils) at a temperature of about 90° C. to 100° C. when decomposition takes place with the formation of sodium sulfate, sulfur dioxid and free sulfur in accordance with the following equations:—

(3) $Na_2S_3O_6 + Na_2S_4O_6 = 2Na_2SO_4 + 2SO_2 + 3S$ (4) $3Na_2S_3O_6 + Na_2S_5O_6 = 4Na_2SO_4 + 4SO_2 + 6S$

This reaction may be set out as follows:—

(5) $Na_2SnO_6 = Na_2SO_4 + SO_2 + (n-2)S$ where $n$ represents the number of sulfur atoms in the polythionate molecule. Other reactions also occur in the heating of the polythionate solution as is evidenced by the formation of free sulfuric acid, in which case there is a greater proportion of free sulfur deposited.

If the solution is sufficiently dilute the sodium sulfate remains in solution and is easily separated from the precipitated sulfur which owing to the heat is agglomerated into the form of porous masses. Should any sodium sulfate be precipitated with the sulfur, it may be washed free therefrom or the mixture of sulfur and sulfate may be mixed with coal and charged into reduction retorts from which sulfur is distilled leaving the sulfate behind.

The clear sodium sulfate solution is now run off to a series of cooling towers, where it is circulated over the gases. These cooling towers are preferably arranged before the absorption towers. Gases from metallurgical roasting operations generally are at a comparatively high temperature so that some of the water of the solutions is evaporated in their passage through these cooling towers resulting in the precipitation of parts of the sodium sulfate. If necessary further evaporation may be effected for the purpose of precipitating further quantities of sodium sulfate.

The gases on leaving the cooling towers are now at a lower temperature and at their dew point, which temperature is also maintained in the washing towers, so that the washing solutions remain at a constant concentration. Regulation of the temperature is attained by means of steam coils in the tanks from which the solutions are being pumped over the towers.

The precipitated sodium sulfate is drained from the accompanying solution and (together with that obtained by precipitation with the sulfid solution as hereinafter described) is mixed with coal and heated for the formation of sodium sulfid.

This reduction is carried out by mixing the sodium sulfate with carbon in the form of coal or coke and heating the mixture in a reducing atmosphere, for example in vertical retorts (such as are used in gas making) at a temperature of from 900° C. to 1200° C. when the two following reactions take place;—

(6) $Na_2SO_4 + 2C = Na_2S + 2CO_2$ (7) $Na_2SO_4 + 4C = Na_2S + 4CO$

The sodium sulfid is leached out of the resultant mass and separated from any carbonaceous residue by decantation or filtration.

This sodium sulfid solution is then used for the regeneration of the other portion of the sodium polythionate solution or that contained in the washing solution circulating in the later towers or washers in the series, for the formation of thiosulfate and precipitation of sulfur in accordance with the following equation:

(8) $Na_2S_3O_6 + Na_2S_4O_6 + Na_2S_5O_6 + 3Na_2S = 6Na_2S_2O_3 + 3S$

This reaction may be set out as follows where $n$ represents the number of sulfur atoms in the polythionate molecule—

$Na_2SnO_6 + Na_2S = 2Na_2S_2O_3 + (n-3)S$

This regeneration of sodium polythionates to sodium thiosulfate by sodium sulfid is preferably effected in a suitable tank or vessel having means for agitating or mixing the reagents and when the reaction is completed the precipitated sulfur is separated by decantation or filtration and the clear solution of thiosulfate reused for washing gases containing $SO_2$ by being preferably circulated over the last tower or washer in the series in which gases containing the last traces of $SO_2$ are met.

It will thus be seen that the above process provides a complete cycle of reactions in which the gases are washed with sodium thiosulfate for the formation of polythionates which are decomposed to form sulfate and then sulfid which latter is used for regenerating other polythionate solutions formed in the process to produce thiosulfate solutions for again treating gases containing $SO_2$.

In conducting this cycle of operations however several modifications may be effected. The sulfur dioxid formed by the decomposition of the polythionates in accordance with the reaction indicated in equations Nos. 3, 4, and 5 may be utilized for preparing pure sulfuric acid or for other industrial purposes in which pure concentrated sulfur dioxid is required or this sulfur dioxid may be passed through a solution of sodium thiosulfate for the formation of sodium polythionate in accordance with equations Nos. 1 and 2.

In the decomposition of the polythionate solution for the formation of sodium sulfate as previously stated free sulfuric acid may be formed. This reaction may be conducted so as to promote the formation of a greater proportion of free sulfur and I have found that this is effected by maintaining the $SO_2$ in contact with the solution as intimate as possible. For this purpose the heating is preferably carried out under pressure. When the solutions resulting from the decomposition of the polythionate contain appreciable quantities of free sulfuric acid it is desirable to neutralize the acid before running the solutions to the cooling towers. This neutralization is preferably effected by adding a sufficient quantity of concentrated sodium sulfid solution (prepared as before described) with or without sodium thiosulfate when sulfur is precipitated and separated together with that resulting from the decomposition of the polythionates.

As another modification and for the purpose of providing means for the precipitation of sodium sulfate for use in the process as above indicated without having recourse to further evaporation than is effected by circulation in the cooling towers I may add a saturated solution of sodium sulfate to the solution of sodium sulfid prepared in the process. In this solution the sodium sulfate is almost insoluble and sodium sulfate is therefore thrown down and settles quickly and may be washed free from the sulfid solution which is separated by decantation or filtration. Sodium sulfid solutions produced by this means will be more dilute or in other words the point of saturation will be at a lower temperature and is used for treating the polythionate solution as above indicated while the precipitated sodium sulfate is added to the sulfate obtained by evaporation as previously set out and reduced with carbon in the form of coal or coke for conversion into sulfid.

In another modification of the above treatment instead of utilizing the polythionate for the production of sodium sulfate this reagent may be obtained from sources extraneous to the operation such as "niter cake" or "salt cake" in which case a quantity of sodium sulfate would be introduced into the cycle from outside sources and reduced with carbon as above set out and used for regenerating the polythionate solution to thiosulfate while an equivalent amount of polythionate would be removed from the cycle and used for the production of sodium thiosulfate (commercially known as sodium hyposulfite) and marketed as such.

I claim:—

1. A cyclic process for the treatment of gases containing sulfur dioxid consisting essentially of washing the said gases with a solution of alkaline thio-sulfate to form polythionates, heating the said poly-thionate solutions to form sulfate, reducing the said sulfate to sulfid, and treating other polythionate solutions formed in the process with the said sulfid to form thiosulfate and using the said thiosulfate for washing fresh gases substantially as described.

2. A cyclic process for the treatment of gases containing sulfur dioxid consisting in subjecting the said gases to washing with a solution of sodium thiosulfate for the formation of sodium polythionates heating the said sodium polythionate solutions to form free sulfur, sulfur dioxid, and sodium sulfate, separating free sulfur from the said sodium sulfate, heating the said sodium sulfate with carbon to form sodium sulfid, and treating other sodium polythionate solutions formed in the process with the said sodium sulfid to form sodium thiosulfate and free sulfur, separating the free sulfur from the said solution and using the thiosulfate solution for washing fresh gases containing sulfur dioxid.

3. In the treatment of gases containing sulfur dioxid in which the said gases are washed with a solution of sodium thio-sulfate the regeneration of the said sodium thio-sulfate from the poly-thionates formed during the absorption of $SO_2$ by treating the said polythionates with sodium sulfid derived from the reduction of sodium sulfate obtained from the decomposition by heat of polythionates formed in the process.

4. In a cyclic process for the treatment of gases containing $SO_2$ as above claimed heating the polythionate solution in such a manner that the sulfur dioxid formed is maintained in as intimate contact as possible therewith for the formation of a maximum quantity of sulfuric acid and free sulfur then neutralizing the said solution with sodium sulfid separating the precipitated sulfur and sodium sulfate substantially as described.

5. In a cyclic process for the treatment of gases containing $SO_2$ as above claimed adding a solution of sodium sulfate to a solution of sodium sulfid for the precipitation of sodium sulfate separating the said sodium sulfate and using the solution of sodium sulfid for regenerating polythionate solutions substantially as described.

6. In a cyclic process for the treatment of gases containing $SO_2$ as above claimed using sodium sulfate solutions obtained therein for contact with the gases in cooling and scrubbing towers for cooling and cleaning the gases and at the same time concentrating the said solutions so that the sodium sulfate is precipitated and the gases saturated with water vapor corresponding to the temperature adopted in the absorption operations substantially as described.

7. In a cyclic process for the treatment of gases containing $SO_2$ as above claimed using sodium sulfate from a source extraneous to the operation and reducing the same to sulfid and using the said sulfid for converting polythionate solutions into thiosulfate and at the same time withdrawing an equivalent amount of sodium thiosulfate from the cycle of operations substantially as described.

In testimony whereof I have signed my name to this specification in the presence of two subscribing witnesses.

EDWARD VICTOR ESPENHAHN.

Witnesses:
CLEM A. HART,
G. R. CULLEN.